(12) United States Patent
Harbison et al.

(10) Patent No.: US 8,991,700 B2
(45) Date of Patent: Mar. 31, 2015

(54) DIMENSIONING AND BARCODE READING SYSTEM

(71) Applicant: Datalogic Automation, Inc., Telford, PA (US)

(72) Inventors: Andrew F Harbison, Glenside, PA (US); Bryan C Glaudel, Perkasie, PA (US); Craig F Wertz, Quakertown, PA (US)

(73) Assignee: Datalogic Automation, Inc., Telford, PA (US)

( * ) Notice: Subject to any disclaimer, the term of this patent is extended or adjusted under 35 U.S.C. 154(b) by 69 days.

(21) Appl. No.: 13/872,031

(22) Filed: Apr. 26, 2013

(65) Prior Publication Data

US 2014/0319218 A1    Oct. 30, 2014

(51) Int. Cl.
*G06K 15/00* (2006.01)
*G06K 7/00* (2006.01)

(52) U.S. Cl.
CPC .................................. *G06K 7/0095* (2013.01)
USPC ...................... 235/383; 235/454; 235/462.14

(58) Field of Classification Search
USPC .................. 235/383, 454, 462.14, 462.31
See application file for complete search history.

(56) References Cited

U.S. PATENT DOCUMENTS

| 5,661,561 | A | 8/1997 | Wurz et al. |
| 5,969,823 | A | 10/1999 | Wurz et al. |
| 6,177,999 | B1 | 1/2001 | Wurz et al. |
| 6,775,012 | B2 | 8/2004 | Wurz et al. |
| 6,808,155 | B2 | 10/2004 | Anthony |
| 8,132,728 | B2 * | 3/2012 | Dwinell et al. ............... 235/454 |
| 8,360,318 | B2 * | 1/2013 | Reynolds et al. ......... 235/462.01 |
| 8,571,298 | B2 * | 10/2013 | McQueen et al. ............ 382/143 |
| 8,746,564 | B2 * | 6/2014 | Olmstead et al. ............. 235/444 |
| 2008/0048029 | A1 * | 2/2008 | Crockett et al. .............. 235/383 |
| 2011/0315770 | A1 | 12/2011 | Patel et al. |

OTHER PUBLICATIONS

Sick AG, "VMS410/VMS510 Volume Measurement System," Operating Instructions, 8010592, R787, Jun. 15, 2007.

* cited by examiner

*Primary Examiner* — Ahshik Kim
(74) *Attorney, Agent, or Firm* — Nelson Mullins Riley & Scarborough, LLP

(57) ABSTRACT

An apparatus and method for calibrating a barcode scanning tunnel has a conveyor structure and a scanning system. The scanning system has a laser light source, an optics system, and a processor. In a calibration mode, the processor locates a central area of the conveyor structure and identifies a first location at which there is a height above the level of the central area according to a predetermined criteria. The processor identifies a second location that is offset, by a predetermined distance in a direction transverse to the direction of travel of the conveyor structure, from the first location.

30 Claims, 13 Drawing Sheets

DIMENSIONING AND BARCODE READING SYSTEM

FIELD OF THE INVENTION

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright whatsoever.

The present invention relates to dimensioners and systems having dimensioners.

BACKGROUND OF THE INVENTION

Referring to FIG. 1, a known dimensioning system 10 includes a conveyor system 12 that moves items along a path of travel, and a component system 14 adjacent to the conveyor system that tracks packages being moved by the conveyor system. Conveyor system 12 includes a number of rollers 16, a belt 24, a bed 18 and a tachometer 20. It should be understood that the conveyor can move the items through the path of travel by means other than belts, for example by driven rollers. Rollers 16 are motor-driven rollers that move conveyor belt 24 in a direction denoted by arrows 26 over bed 18, which provides support to the belt. For purposes of the present discussion, the direction corresponding to the start of conveyor system 12 is referred to as "upstream," whereas the direction in which conveyor belt 24 moves is referred to as "downstream."

Tachometer 20 is beneath and in contact with the surface of conveyor belt 24 and rotates with the belt as the belt moves in the direction of arrows 26. As tachometer 20 rotates, it outputs a signal comprising of a series of pulses corresponding to the conveyor belt's linear movement and speed. Tachometer 20, and other devices that provide signals corresponding to the rate of movement of a conveyor belt, from which the locations of items moving in a path of travel along the belt can be determined, as should be understood by those of ordinary skill in the art. In general, the number of pulses output by tachometer 20 corresponds to the linear distance traveled by the belt, while pulse frequency corresponds to the belt's speed. The number of tachometer pulses per unit of measurement defines the tachometer's resolution and its ability to precisely measure the distance that the conveyor belt has moved. Tachometer 20 may be replaced by a shaft encoder, particularly where less accurate measurements are needed.

Component system 14 includes a dimensioner 28, a plurality of barcode scanners 32, and optionally a separate system computer 36, all of which are attached to a frame 38. Frame 38 supports dimensioner 28 and at least one barcode scanner 32 horizontally above conveyor belt 24 so that beams of light emitted by the dimensioner and scanners intersect the top surfaces of packages moved by the belt. Frame 38 also supports additional scanners 32 vertically adjacent to conveyor belt 24 so that beams of light emitted by these scanners intersect the side, back, front or bottom surfaces of packages moved by the belt. Examples of prior art laser scanner barcode readers include the DS_series, DX8200A, AXIOM and AL5010 barcode readers manufactured by formerly Accu-Sort Systems, Inc. and Datalogic Automation, Inc. of Telford, Pa., although it should be understood that camera-type barcode readers, for example the AV6010 barcode reader manufactured by Datalogic Automation. Inc., or other suitable barcode readers could be used, depending on the needs of a given system.

As should be understood in this art, dimensioner 28 detects one or more dimensions of an item on a conveyor. In a system designed to track singulated packages (i.e. packages carried by the conveyor so that they do not overlap in the direction of travel, and are thus easily distinguishable by a photodetector with a direction of vision in the x direction) the dimensioner is disposed along the conveyor at a known position relative to the bar code readers and a photoeye. When a package moving along the conveyor reaches the photoeye, the photoeye outputs a signal to the dimensioner. The dimensioner also receives tachometer data and therefore knows the tachometer count that occurred when the package was detected at the photoeye. The dimensioner opens a package record and associates the tachometer count corresponding to the photoeye event. The dimensioner also knows the distance (in tachometer pulses) between the photoeye and the dimensioner. Thus, when a package reaches the dimensioner, the dimensioner reads the present tachometer count, subtracts the predetermined distance back to the photoeye, and checks the existing package records for the record having that resulting tachometer count. The dimensioner determines the package's height, width and length, and associates that data in the package record. Alternatively, the photoeye data may be received by separate computer 36, instead of the dimensioner. In such an embodiment, the dimensioner creates an individual package record when a package reaches the dimensioner, determines the package's height, width, and length, associates the dimension data and the tachometer count with the package record, and outputs the dimension data to system computer 36 which, in turn, associates the dimension data with the correct photoeye record.

The barcode reader also receives the photoeye signal and also knows the distance from the photoeye to its scan line. As does the dimensioner, the barcode reader opens a package record upon receiving a photoeye signal indicating presence of a package, and associates the corresponding tachometer value with that record. When a package reaches the reader's scan line, the reader backs the photoeye/reader distance from the present tachometer value, identifies the package record that corresponds to the resulting value, and associates barcode data from the package with the selected record. As should be understood in this art, barcode reader 32 may comprise a laser scanner that projects a plurality of laser lines on the belt, for example in a series of "X" patterns, that the reader utilizes to detect and read barcodes. The barcode processor accumulates barcode data while a given package passes through the X patterns and stores the accumulated barcode data to the package record. More specifically, the barcode scanner processor knows the package length based on the original photoeye data, and so knows, following the point when the leading edge reached the reader's scan line, when the following edge passes. Thus, the reader can store in the record all barcode data detected therebetween.

Each of the dimensioner and the barcode readers know the system transmit point, which is defined in terms of distance, or tachometer pulses, from the photoeye to a point sufficiently downstream of all dimensioners and readers that the trailing edge of the largest package the system is expected to carry will have cleared all tunnel devices by the time the package's leading edge reaches the transmit point. As noted above, all of the dimensioner and the readers track all packages passing the photoeye. Each device accumulates information in a respective package record as the package moves through the tunnel, and each device monitors the tachometer data following creation of each package record. When, following the creation of a package record, the dimensioner and readers determine that a number of tachometer pulses corresponding to the distance between the photoeye and the transmit point have passed, each of these devices outputs its package record to the host system.

As should be understood, however, dimensioners and scan-type barcode readers are utilized in systems other than singulated scanning tunnels. For instance, such devices may be used in non-singulated tunnels, in which packages may overlap in the direction of the belt's travel. Such systems may omit the photoeye, in that packages are not tracked through the system, but on the other hand such systems may utilize sophisticated dimensioning and barcode location algorithms, for example for purposes of determining compliance with size restrictions or identifying items passing through checkpoints. For purposes of the present disclosure, the use of a dimensioner or a scanning type system in other types of devices is not limited to singulated tracking systems and may be used outside of conveyor systems.

The system described with respect to FIG. 1 includes barcode scanners that project an X-pattern across the belt. It should be understood by those skilled in the art that X-pattern scanners can be replaced with line scan readers for detecting and reading barcodes, or with camera-type readers.

Once installed, the dimensioner and readers may be calibrated. One set up and calibration method applicable to such devices is described in U.S. Pat. No. 8,360,318 and Publication 2011/0315770, the entire disclosure of which is incorporated by reference herein. Calibration data may include the dimensioner's and each barcode reader's pitch angle, yaw angle, roll angle, and height with respect to the belt. Particularly where the devices are used in singulated conveyor systems, calibration may also develop a correlation of three dimensional coordinates or other position information among the dimensioner and the readers so that information from the devices can be related among the devices and/or associated with the correct items on the belt.

In the system shown in FIG. 1, dimensioner 28 may be of a type as disclosed in U.S. Pat. Nos. 6,775,012, 6,177,999, 5,969,823, and 5,661,561, the entire disclosures of which are incorporated by reference herein. With regard to such dimensioners, dimensioner 28 comprises a light source, such as a laser, and a rotating reflector disposed within the dimensioner housing that produce a scanning beam (denoted in phantom at 40) that is directed down at conveyor belt 24. That is, the rotating reflector scans the single point light source across the width of belt 24. Each angular position of the reflector represents an x-axis location across the belt. Scanning beam 40 intersects belt 24 at line 42 in a manner that is transverse (x-axis 80) to the belt's linear movement (y-axis 82) in the path of travel at a fixed angle with respect to an axis normal (z-axis 84) to the belt's surface. Packages moving on belt 24, such as package 62, intersect scanning beam 40, thereby creating an offset in the scanning beam in the y-direction (along y-axis 82). In particular, the laser light source is positioned downstream in the y-axis 82 direction so that the plane of light is reflected at an angle from z-axis 84. Thus, as a box moves downstream the intersection of the plane of light is a continuous line across the belt in along x-axis 80. When a box intersects the plane of light, the portion of the plane intersected by the box shifts forward toward the light source (in the y direction) since the light on the box travels a shorter distance than the light that intersects the belt on the left and right sides of the box. This offset or shift in the light on the box surface is proportional to the height of the box.

Both conveyor belt 24 and the packages thereon reflect light created by the scanning beam back to the rotating mirror, which reflects light to a linear array of line scan CCD detectors or a CMOS imager (not shown) within dimensioner 28. The array is oriented parallel to y-axis 82. Because the rotating mirror reflects both the outgoing and reflected laser light, the mirror returns the reflected light to a constant x-axis position, but the reflected light shifts in the y-direction correspondingly to the shift in line 42 caused by the height of a package 62 and the angle at which the scanned laser beam intersects the belt. Thus, the linear array of CCD or CMOS detectors should be accurately aligned in the y-direction to thereby detect the return light's y-axis shift. Moreover, because the array is made up of a single line of pixel sensors, the alignment should be properly aligned to detect the reflected light. The rotating mirror's angular position corresponds to the x-axis position of any given point of reflected light.

In a still further arrangement, a mirrored wheel-type scanning dimensioner may direct a laser scan pattern 40 down to the belt in a vertical plane, parallel to the z axis. As a mirror facet on the wheel sweeps a laser beam across the target surface, that same facet receives the light reflected from the target and reflects this return light back into the dimensioner optics. As long as the beam sweeps across an area of constant height, the return beam reflected from the facet to the detector through the optics remains in a constant position. If the target height changes, however, the return light shifts in the x direction. The amount of the shift depends on the angle between the z axis and the axis of the laser beam (or of the returned light), and there is no shift when the beam is directly vertical. This, in turn, causes a linear shift in the return light on the detector, which can be correlated to height above the belt given knowledge of the wheel's angular position when the shift occurs.

Dimensioner 28 generates a signal representative of the height of an object such as package 62 across conveyor belt 24 as described by the y-axis or, depending on the type of dimensioner, x-axis offset detected in scanning beam 40. The signal is also representative of the x-axis positions of the height data by association of that data with the mirror's angular position. Based on the height data and corresponding x-axis data, the dimensioner processor (not shown) determines the cross sectional height profile of an object on the belt and, by accumulating such profiles along the object's length, the object's three dimensional profile.

Still further, a dimensioner may be configured as described in U.S. Pat. No. 8,360,318, in which a laser projects a light pattern from the dimensioner with an optical axis directed downward in the x-z plane, and at an angle theta with respect to the z axis. As illustrated in and described with respect to FIG. 19 of the '318 patent, a pair of such lasers may be provided, to prevent shadowing, if desired. The laser devices may project a pattern of sequential light and dark bars or dots, or combination of such or other geometric shapes, across the belt in the x direction. The linear sensor is also aligned in the x direction, i.e. transverse to the belt's direction of movement, so that the sensor detects the reflected light pattern. Due to the laser light's projection at angle theta, when an object passes into the laser device(s) field(s) of view, the pattern detected by the sensor shifts in the x direction.

The dimensioner generates a signal representative of the item's height, extending across conveyor belt 24 over the item's width, as described by the x-axis offset detected in the scanning beam. The signal is also representative of the x-axis positions of the height data by identification of the portion of the pattern that shifts, given the otherwise known position of the shifted portion in the overall pattern, as described in U.S. '318. Based on the height data and corresponding x-axis data, the dimensioner processor determines the cross sectional height profile an object on the belt and, by accumulating such profiles along the object's length, the object's three dimensional profile.

SUMMARY

The present invention recognizes and addresses the foregoing considerations, and others, of prior art constructions and methods.

One or more of these and/or other objects may be achieved in an embodiment of a method of calibrating a barcode scanning tunnel, in which a scanning tunnel is provided that has a frame, a conveyor structure with a generally planar surface and that is moveable with respect to the frame in a direction of travel, and a scanning system. The scanning system is in a position with respect to the frame that is fixed during movement of the conveyor structure in the direction of travel. The scanning system has a collimated light source, an optics system, a detector, and a processor. The optics system directs light from the source toward the conveyor structure so that the light extends across the conveyor structure transverse to the direction of travel and reflects from positions on the conveyor structure and positions on objects carried by the conveyor structure. The optics system receives light reflected from the positions. The detector receives the reflected light from the optics system and outputs a signal corresponding to at least one characteristic of the reflected light. The processor receives the signal output by the detector and determines a distance between the generally planar surface and the positions from which the light is reflected based on a characteristic of the output signal. In a calibration mode, the processor determines distances corresponding to positions extending across a central portion of the conveyor structure, identifies a first location proximate the central portion, in a direction transverse to the direction of travel, at which the distance is greater than the distances determined at positions in the central portion according to a predetermined criteria, and identifies a location that is offset, in a direction transverse to the direction of travel, by a predetermined offset distance. A reference structure with an edge surface has a height sufficient to meet the predetermined criteria. The reference structure is disposed on the belt so that the edge surface faces a central portion of the conveyor structure. An actual distance between the edge surface of the reference structure and an edge of the conveyor structure is communicated to the processor so that the processor applies the actual distance as the offset distance in the calibration mode. The scanning system is activated in the calibration mode so that the light directed from the source extends across the edge surface of the reference structure.

In another embodiment, a scanning tunnel has a frame, a conveyor structure with a generally planar surface and that is moveable with respect to the frame in a direction of travel, and a scanning system. The scanning system is in a position with respect to the frame that is fixed during movement of the conveyor structure in the direction of travel. The scanning system has a laser light source, an optics system, a detector, and a processor. The optics system directs light from the source toward the conveyor structure so that the light extends across the conveyor structure transverse to the direction of travel and reflects from positions on the conveyor structure and positions on objects carried by the conveyor structure. The optics system receives light reflected from the positions. The detector receives the reflected light from the optics system and outputs a signal corresponding to at least one characteristic of the reflected light. The processor receives the signal output by the detector and determines a distance between the generally planar surface and the positions from which the light is reflected based on a characteristic of the output signal. In a calibration mode, the processor determines distances corresponding to positions extending across a central portion of the conveyor structure, identifies a first location proximate the central portion, in a direction transverse to the direction of travel, at which the distance is greater than the distances determined at positions in the central portion according to a predetermined criteria, and identifies a location that is offset, in a direction transverse to the direction of travel, by a predetermined offset distance.

In another embodiment of the present invention, a scanning tunnel has a frame, a conveyor structure with a generally planar surface and that is movable with respect to the frame in a direction of travel, and a scanning system. The scanning system is in a position with respect to the frame that is fixed during movement of the conveyor structure in the direction of travel. The scanning system has a collimated light source, an optics system, a detector, and a processor. The optics system directs light from the source toward the conveyor structure so that the light extends across the conveyor structure transverse to the direction of travel and reflects from positions on the conveyor structure and positions on objects carried by the conveyor structure. The optics system receives light reflected from the positions. The detector receives the reflected light from the optics system and outputs a signal corresponding to at least one characteristic of the reflected light. The processor receives the signal output by the detector and determines a distance between the generally planar surface and the positions from which the light is reflected based on a characteristic of the output signal. In a calibration mode, the processor automatically determines a predetermined plurality of parameters used by the processor to determine the distance, based on a plurality of detections of said distances determined as a result of light provided and received under initial values assigned to the parameters. In a still further embodiment, the light source is a laser light source.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
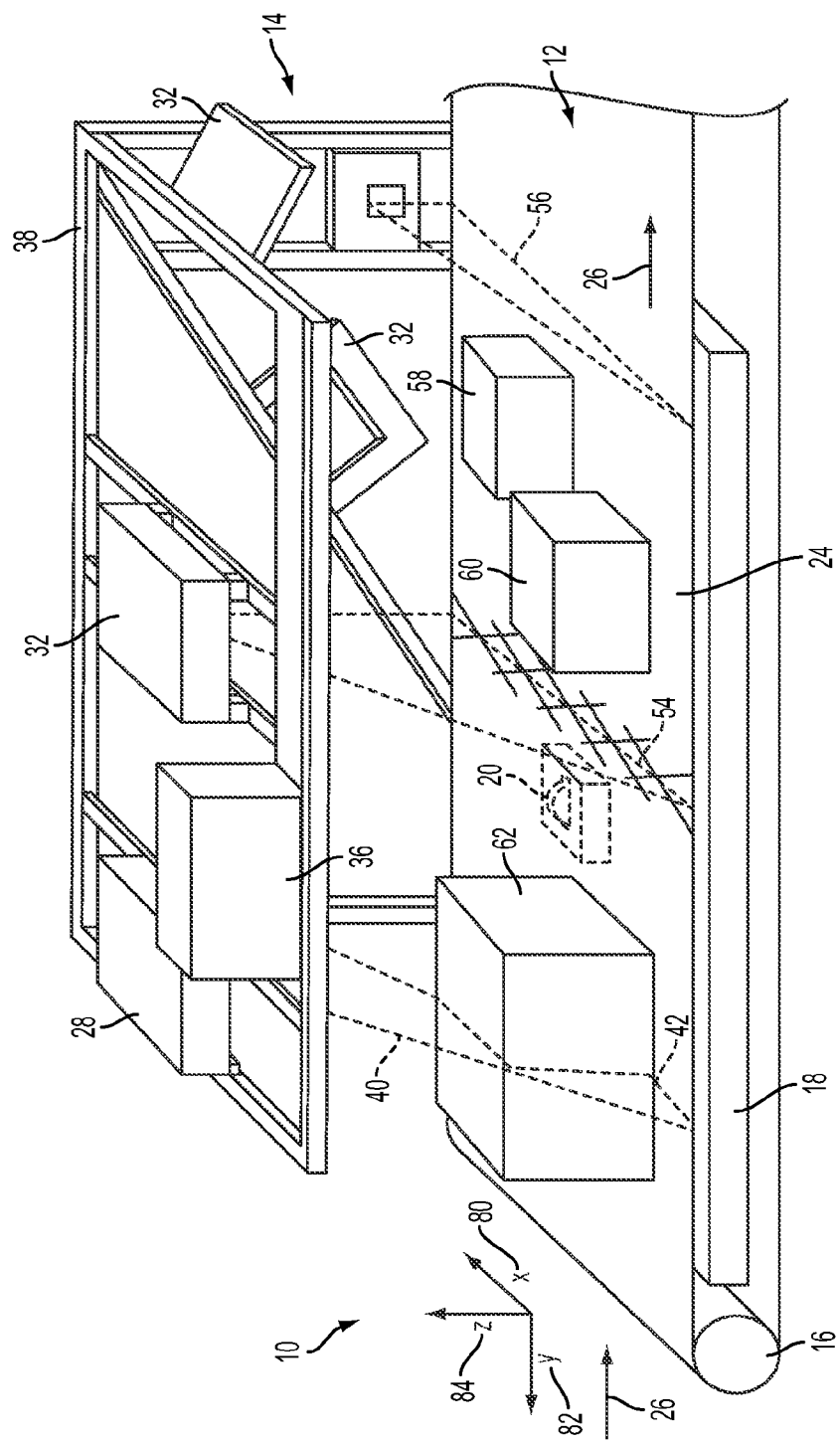
FIG. 1 is a schematic illustration of a prior art dimensioning and barcode reading system.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Additional aspects and advantages of the invention will be set forth in part in the description which follows and, in part, will be obvious from the description, or may be learned by practice of the invention.

Example of System Structure

Except as discussed below, the system described herein is arranged and configured as discussed above with respect to FIG. 1.

Figure 2:
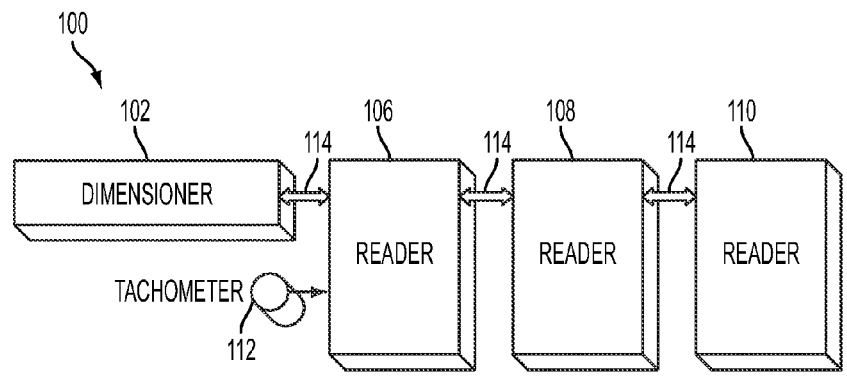
FIG. 2 is a block diagram of a dimensioning system in accordance with an embodiment of the present invention.

Referring to FIG. 2, a dynamic dimensioning system 100 generally comprises a dimensioner 102 for determining the height and rough dimensions of a box being transported on a conveyor, multiple barcode readers 106, 108, 110 and a tachometer 112 connected to at least one reader 106 that outputs a signal representative of the conveyor belt's movement. The dimensioner and the readers are networked together by, for example, an Ethernet connection 114. While only three readers are shown in FIG. 2, it should be understood that any number of readers can be networked together to form a scanning tunnel One of skill in the art should understand that Ethernet is a local-area network (LAN) architecture that uses a bus or star topology and supports data transfer rates of 10 Mbps. Ethernet uses the CSMA/CD access method or other LAN standard to handle simultaneous demands. A version of Ethernet, called 100Base-T (or Fast Ethernet), supports data transfer rates of 100 Mbps, and Gigabit Ethernet supports data rates of 1 gigabit (1,000 megabits) per second.

Figure 3:
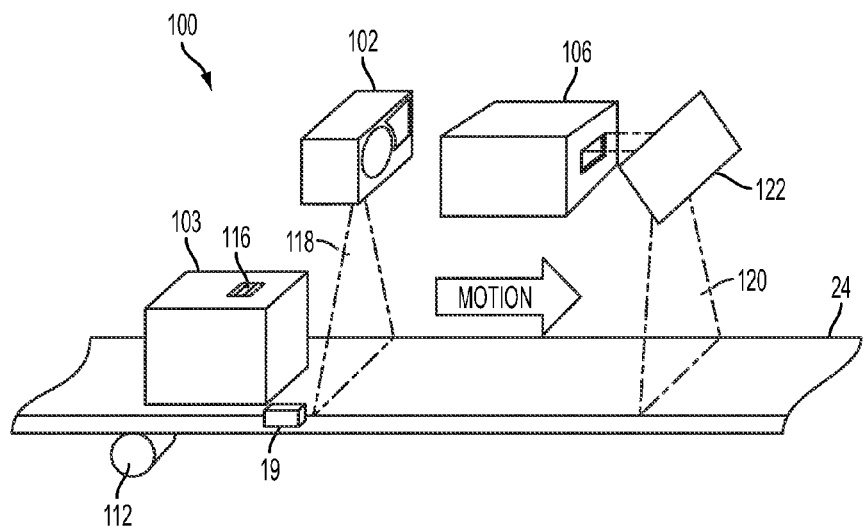
FIG. 3 is a schematic illustration of a portion of the dimensioning system of FIG. 2.

Referring to FIG. 3, dynamic dimensioning system 100 is a singulated conveyor tracking system that scans objects, such as object 103, moving on a conveyor structure, for example a belt 24, decodes indicia, such as barcodes 116, located on the object and transmits the information to a host system (not shown) for further processing. Shown in the figure is a top read barcode reader 106 and dimensioner 102 in accordance with one embodiment of the present invention. In general, objects are moved through a field of view 118 of dimensioner 102. Dimensioner 102 detects the presence of object 103 and determines the range, extent and orientation of the object with respect to the conveyor belt. The extents of an object refer to the left and right edges of the object along x-axis 80. The dimensioner and the reader receive data from photoeye 19, create package records, and accumulate information in association with those records, in the manner as discussed above with regard to FIG. 1. Although scanning-type readers are discussed herein for use with the system as in FIG. 3, it will be understood that camera-type readers could also be used, and in that event, dimensioner 102 may transmit height and extent data to a camera-type reader 106, which uses the information to focus its optics to maximize the efficiency and effectiveness of detecting and reading barcode 116.

It should be understood, moreover, that the arrangement shown in FIG. 2 is provided for purposes of example only and in particular that a dimensioner such as shown at 102 may be used in various environments for various purposes. For instance, a dimensioner may be used in a non-singulated system, or may be used in a non-conveyor system as a standalone device.

Referring again to FIGS. 2 and 3, each reader 106, 108 and 110 processes the data and locates and decodes any barcode data present on the object by detecting light reflected from the object being scanned. Once the object reaches a predetermined transmit point downstream from the tunnel system (this point is set by the host), the dimensioner and the readers transmit the barcode data to the host system for further processing. It should be understood that reader 106 may be mounted to direct its field of view 120 directly onto conveyor 24, or the field of view may be redirected by a mirror 122 as shown in FIG. 3. Redirect of the field of view allows the reader to be positioned so that its scanning image is parallel to y-axis 82, where mirror 122 redirects the field of view along z-axis 84.

Hard Set-Up

Figure 4:
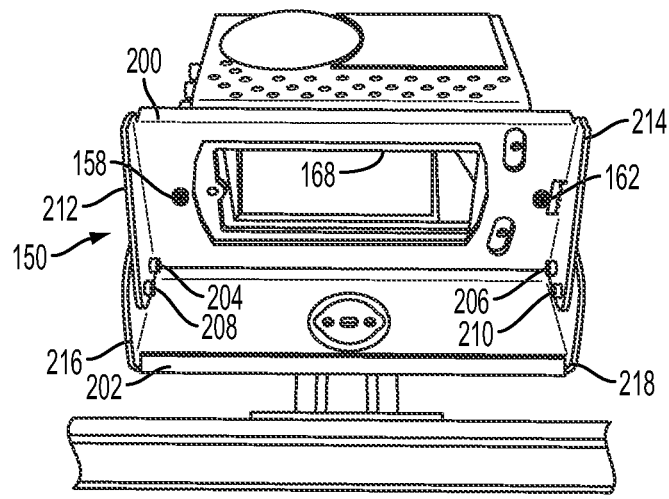
FIG. 4 is a schematic illustration of a dimensioner and mounting structure of the system as in FIG. 2.
Figure 5:
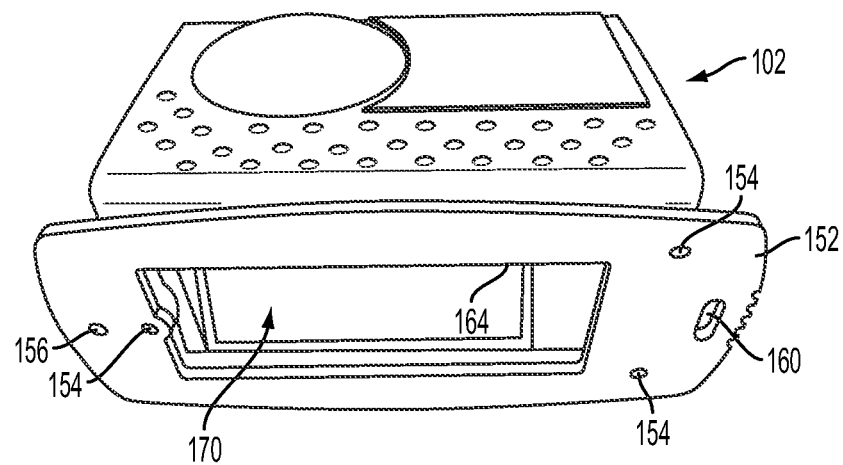
FIG. 5 is a schematic illustration of a dimensioner and mounting structure of the system as in FIG. 2.

Referring to FIGS. 4 and 5, dimensioner 102 attaches to frame 38 (FIG. 1) in one embodiment by a universal mounting bracket 150 and a mounting plate 152. Mounting plate 152 attaches to the housing of dimensioner 102 by screws extending through respective screw holes 154 in mounting plate 152 and threadedly into the housing of dimensioner 102. Dimensioner 102 then attaches to the upper surface of mounting bracket 150 by respective screws extending through hole pairs 156/158 and 160/162. The screws are threaded into nuts on the side of the structure opposite the screw head. Hole 160 is elongated to allow pivotal movement of mounting plate 152, and therefore dimensioner 102, about the axis of hole pair 156/158, as described below. Elongated apertures 164 and 168 respectively extend through mounting plate 152 and mounting bracket 150 and align with an exit window 170 through which laser scanning beam 40 (FIG. 1) exits the dimensioner. The laser scanning beam sweeps along the generally common axis of exit window 170 and apertures 164 and 1668, and dimensioner 102 is therefore secured to frame 38 so that this generally common axis is aligned in x axis 80 (FIG. 1).

It should be understood that while laser light sources, and laser scanning systems, are discussed herein, other light sources may be utilized, such as high-powered light emitting diodes. Thus, the discussion of lasers herein should be understood to be by way of example.

Figures 6A, 6B:
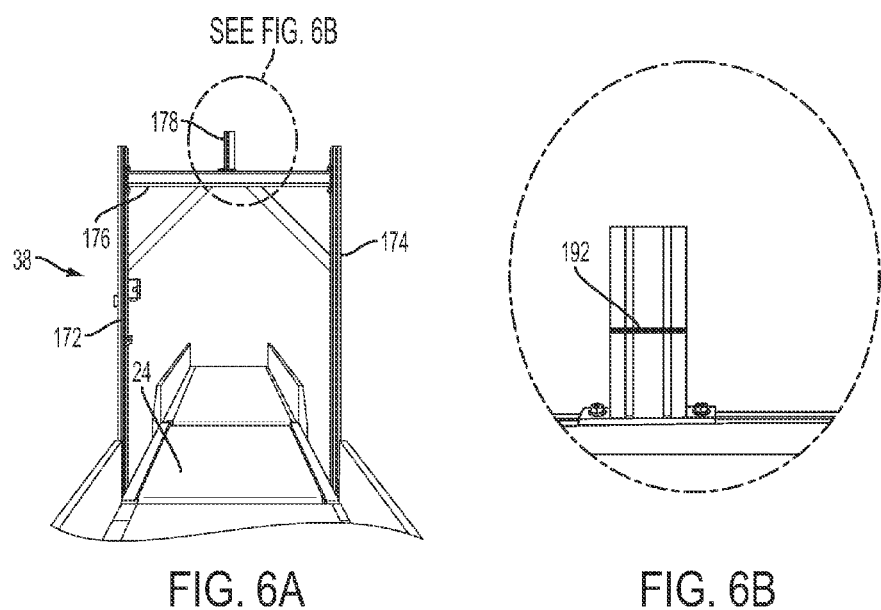
FIG. 6A is a partial schematic illustration of a tunnel frame of the system as in FIG. 2.
FIG. 6B is a partial schematic illustration of a tunnel frame of the system as in FIG. 2.

Referring to FIGS. 6A and 6B, frame 38 includes a pair of opposing vertical members 172 and 174 on opposing sides of conveyor belt 24, and a horizontal cross member 176 extending between members 172 and 174, above and parallel to the planer surface of belt 24, transverse (i.e. in x direction 80) to the belt's moving direction. Attached to cross member 176 and extending up and away (i.e. in z direction 84 (FIG. 1)) from belt 24 is a vertical member 178. Vertical members 172 and 174 attach to side rails adjacent and parallel to belt 24, so that the mid point of cross member 176 is approximately above the center axis of belt 24 (i.e. the axis in the center of belt 24 in the direction of the belt's travel), but in a preferred embodiment, vertical member 178 attaches to cross member 176 via a bracket that can be adjusted in position along cross member 176 so that vertical member 178 can be positioned and secured (e.g. by tightening screws on the bracket so that the bracket and vertical member are fixed in position on the cross member) on cross member 176 so that the vertical center axis of elongated vertical member 178 is perpendicular to and passes through the center axis of belt 24.

Figure 6C:
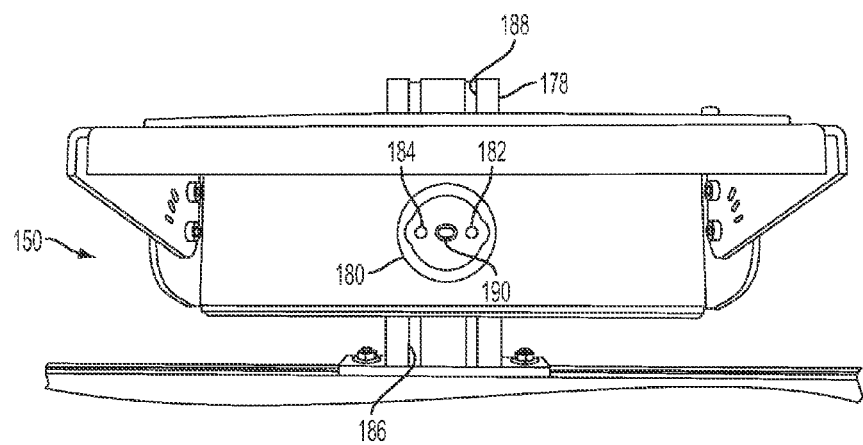
FIG. 6C is a partial schematic illustration of a dimensioner mounting structure and tunnel frame of the system as in FIG. 2.

Referring also to FIG. 6C, bracket 150 attaches to vertical member 178 by a pair of screws 182 and 184 that extend through holes in a fitting 180 fixed in a back plate of mounting bracket 150 and into threaded nuts (not shown) that are slidably received by respective vertical grooves 186 and 188 in vertical member 178. Another pair of nuts (not shown) are disposed between the back plate and vertical member 178, so that the screws extend through these nuts and into the nuts in grooves 186 and 188. Fitting 180 defines a through-hole 190 through which the front face of vertical member 178 is visible. After placing mounting bracket 150 up against vertical member 178 and initially threading, but not finally tightening, screws 182 and 184 into the threaded nuts in the grooves, the operator moves the mounting bracket up or down until a mark 192 is visible in window 190. The operator then finally tightens screws 182 and 184 into the nuts, and tightens the second pair of nuts, thereby fixing bracket 150 and dimensioner 102 at a predetermined height above the surface of belt 24, and with the sweep of laser scan 40 aligned in x direction 80.

More particularly, in the presently-described embodiment, the initially installed operating parameters stored in dimensioner 102 assumes that the dimensioner is disposed at a predetermined height (X) above the surface of belt 24, e.g. considered as the distance between exit window 170 and the belt. Since the dimensions of mounting bracket 150 and mounting plate 152 are known, the vertical distance (Y) between exit window 170 and fitting window 190 (when dimensioner 102, mounting plate 152, and mounting bracket 150 are assembled) is also known, and so the operator measures a distance X-Y above the surface of belt 24 and makes mark 192 at that distance. Thus, when the operator mounts dimensioner 102 onto vertical member 178 using mark 192, as described above, the dimensioner is thereby attached to frame 38 at the predetermined height above belt 24 that corresponds to the factory parameters, and the sweep of the laser scan light is generally aligned in the direction transverse to the belt's travel direction. As described in U.S. Pat. No. 8,360,318, a plumb bob may also be used to adjust the dimensioner to the predetermined height, and moreover, it should be understood that various methods and arrangements may be used to secure the dimensioner to a fixed position with respect to the belt. In certain embodiments, for example, the dimensioner is not attached to the frame and may be, for example, attached to a ceiling or other structure that provides a fixed-position support during operation. At this point, the operator makes communications connections needed to connect the dimensioner to the other devices in the tunnel and to the central computer system, and powers up the dimensioner so that the device is operative.

Although the system will generally have a predetermined height assumption at the factory, the user may place the dimensioner at a height other than the assumed height. The calibration process described below determines the actual height and resets the height value.

The operator now mechanically adjusts the dimensioner's position with respect to the belt to thereby define the dimensioner's pitch, roll and yaw angle with respect to the conveyor belt.

The operator begins by adjusting the dimensioner's roll, or skew, angle. The roll angle refers to the dimensioner's rotational position about an axis that passes through the dimensioner and that is parallel to the center line of belt 24. Assume a vertical plane that includes this dimensioner axis and the belt center line, and assume an object sitting on the belt has a planar top that is parallel to the belt surface, is perpendicular to this vertical plane, is between the belt and dimensioner window 170, and extends entirely across the belt in the x direction 80. The dimensioner is originally constructed and set so that at a given rotational position of the dimensioner, the dimensioner measures the object's top surface to have the same height entirely across the belt. The dimensioner housing is formed with a generally planar top surface that is parallel with the surface of belt 24 when the dimensioner is in this rotational position. The object of the roll/skew calibration is to set the roll angle in the tunnel, with respect to the actual belt surface, to achieve this condition in the tunnel itself. The operator first places a bubble level across the belt's surface, transverse to the belt's direction of travel (i.e. aligned in x direction 80), and notes the bubble position. The operator then places the bubble level onto the top surface of dimensioner 102, again aligned in x direction 80, and notes the bubble position. If the bubble is at the position marked on the level when the level was placed on and across the belt surface, the dimensioner is already at the desired roll angle. If not, the operator may slightly loosen respective nuts on set screws 182 and 184, loosening fitting 180 within the back plate of mounting bracket 150 and allowing the mounting bracket to be rotated slightly about an axis of fitting 180 that is parallel to the center line of belt 24. The operator rotates the mounting bracket about this axis until the bubble of the level on dimensioner 102 reaches the same position as when the level was placed across the belt. The operator then retightens the nuts of set screws 182 and 184. During this process, the user should maintain the dimensioner's vertical position on vertical member 178 so that mark 192 remains visible in window 190.

The operator then adjusts the dimensioner's yaw angle, which can be considered the angle in the x-y plane between x axis 80 (FIG. 1), i.e. the axis transverse to the belt's direction of travel, and the axis in the x-y plane defined by the sweep of the dimensioner's laser scan 40. To correct for yaw angle, the operator places a test box 194, which has planar sides meeting at right angles and straight edges (i.e. having a consistent rectangular cross-section along the box's length in the x direction), on the surface of belt 24 so that a front surface of box 194 is aligned in x direction 80. The box can be aligned in direction 80 by various methods, for example by aligning one side of a T-square against an edge of belt 24 so that the other side of the square extends across the belt, and aligning the box with the square's second side. The operator then activates the dimensioner, so that the dimensioner projects laser scan 40 toward the belt, and moves box 194, directly or through movement of belt 24, so that the box's front edge reaches the laser scan. The operator observes the position of the dimensioner's laser pattern relative to the box's front edge. As the desired yaw angle is zero degrees, if the laser scan pattern is aligned with the box front edge, no adjustment is necessary. If there is misalignment, i.e. if there is an observable non-zero angle, the operator adjusts the dimensioner's position about an axis parallel to z axis 84 (FIG. 1). Referring again to FIGS. 4 and 5, the operator slightly loosens the screws in holes 158 and 162. The elongation of slot 160 allows dimensioner 102 and mounting plate 152 to move to a limited degree with respect to mounting bracket 150, thus allowing the operator to slightly pivot dimensioner 102 about the z-parallel axis passing through hole 158. Because of the predetermined orientation of vertical member 178, mounting bracket 150, and mounting plate 152, relatively little adjustment to yaw angle should be needed. Thus, the length of elongation of slot 160 is typically relatively short but can be of any desired length. To rotate dimensioner 102 and mounting plate 152 the desired small increment, a notch 196 is provided in the side of mounting bracket 150, opposite a plurality of notches 198 in the opposing side of mounting plate 152. By inserting a flathead screwdriver or other elongated implement into a notch 198 through notch 196, the operator levers the screwdriver in the x-y plane so that the tip of the screwdriver moves the mounting plate in the desired rotational direction about the axis passing through hole 158, thereby moving slot 160 relative to the screw passing through holes 160 and 162. The operator repeats this process until laser scan 40 observably aligns with the front of box 194.

Figure 9:
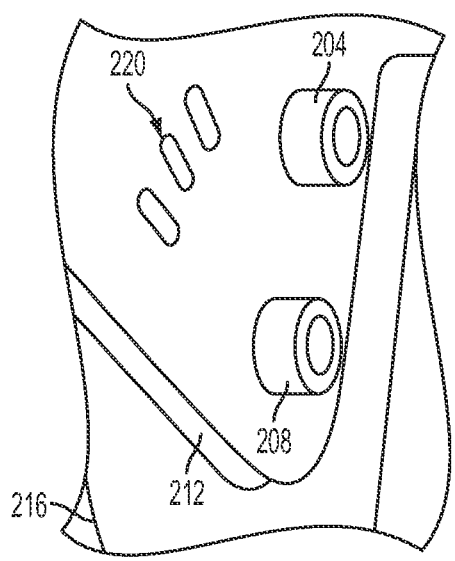
FIG. 9 is a partial schematic view of the mounting structure as in FIG. 8A.

The operator then adjusts the dimensioner's pitch angle, which can be considered the angle between the plane of laser scan 40 and z-axis 84 (FIG. 1). Mechanically, and referring also to FIG. 4, this is accomplished by pivoting a top section 200 of mounting bracket 150 with respect to a back section 202, about an axis passing through screws 204 and 206 that attach top section 200 to back section 202. A pair of screws 208 and 210 pass through respective holes in flanges 212 and 214 of top section 200 and through elongated slots in flanges 216 and 218 of back section 202. To adjust pitch angle, screws 204, 206, 208, and 210, which are held in position by respective threaded nuts on the opposite sides of flanges 216 and 218, are loosened slightly. Referring also to FIG. 9 each of flanges 216 and 218 (only one of which is shown in FIG. 9) defines a notch that opposes three slots 220 respectively in flanges 212 and 214 (only one of which is shown in FIG. 9). By inserting a flathead screwdriver or other elongated implement into the flange 216 or 218 notch and into a slot 220, the operator levers the screwdriver in the x-z plane so that the tip of the screwdriver pivots top section 220 about the axis through screws 204 and 206 in the desired rotational direction, thereby moving the slots in flanges 216 and 218 relative to screws 208 and 210.

Figure 7:
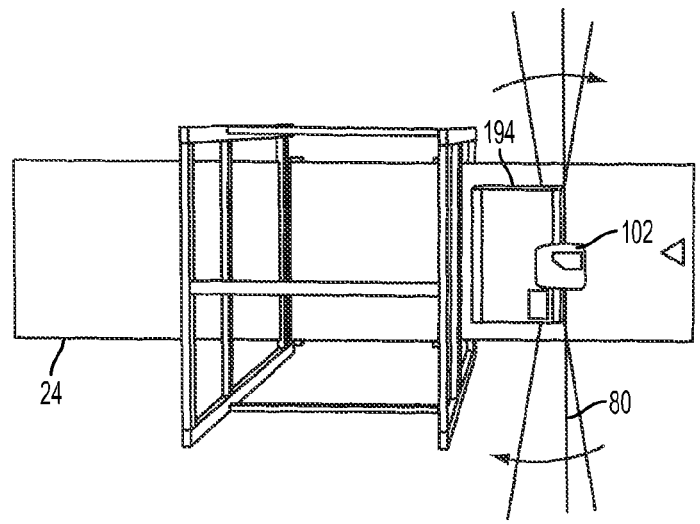
FIG. 7 is a partial schematic illustration of a dimensioner system as in FIG. 2.
Figure 8A:
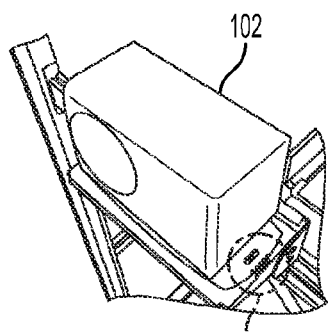
FIG. 8A is a partial schematic illustration of a dimensioner system as in FIG. 2, illustrating a dimensioner and mounting structure.
Figure 8B:
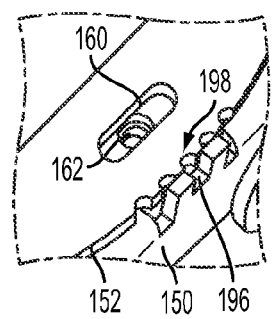
FIG. 8B is a partial schematic view of the mounting structure as in FIG. 8A.

To adjust pitch angle, the operator again relies upon the front face of test box 194 (FIG. 7), which remains aligned with x axis 80, as discussed above, so that the box's front face is vertical, parallel with z axis 84 (FIG. 1). Z-axis 84 is, in turn, defined as the axis perpendicular to the surface of belt 24. The operator activates the dimensioner, so that the dimensioner projects laser scan 40 toward the belt. If the box is not already in position, the operator moves box 194, directly or through movement of belt 24, so that the box's front edge reaches the laser scan. The operator observes the position of the dimensioner's laser pattern relative to the box's front edge. The desired pitch angle is zero degrees, and in this condition, the laser scan should run evenly along the box front face. If this condition exists initially, no adjustment is necessary. If there is misalignment, i.e. if there is an observable discrepancy between the laser scan and the box front surface, i.e. an observable non-zero pitch angle, the operator adjusts the dimensioner's position about an axis parallel to x axis 80 via adjustment of the mounting bracket's top section 200 as described above until laser scan 40 observably aligns with the front of box 194.

The operator then conducts a procedure that determines several parameters under which the dimensioner operates. A primary objective of these parameters is to identify boundaries of the scan field within which the dimensioner will consider information to exist, and to exclude from consideration information outside these boundaries. The operation parameters relate to the construction and operation of the scanning system of dimensioner 102, and a description of an example of such a dimensioner 102 is provided below. It should be understood, however, that this is for purposes of example only, and that parameters may vary as needed, for example for use with triangulation-type scanning dimensioners such as discussed above.

Figure 18:
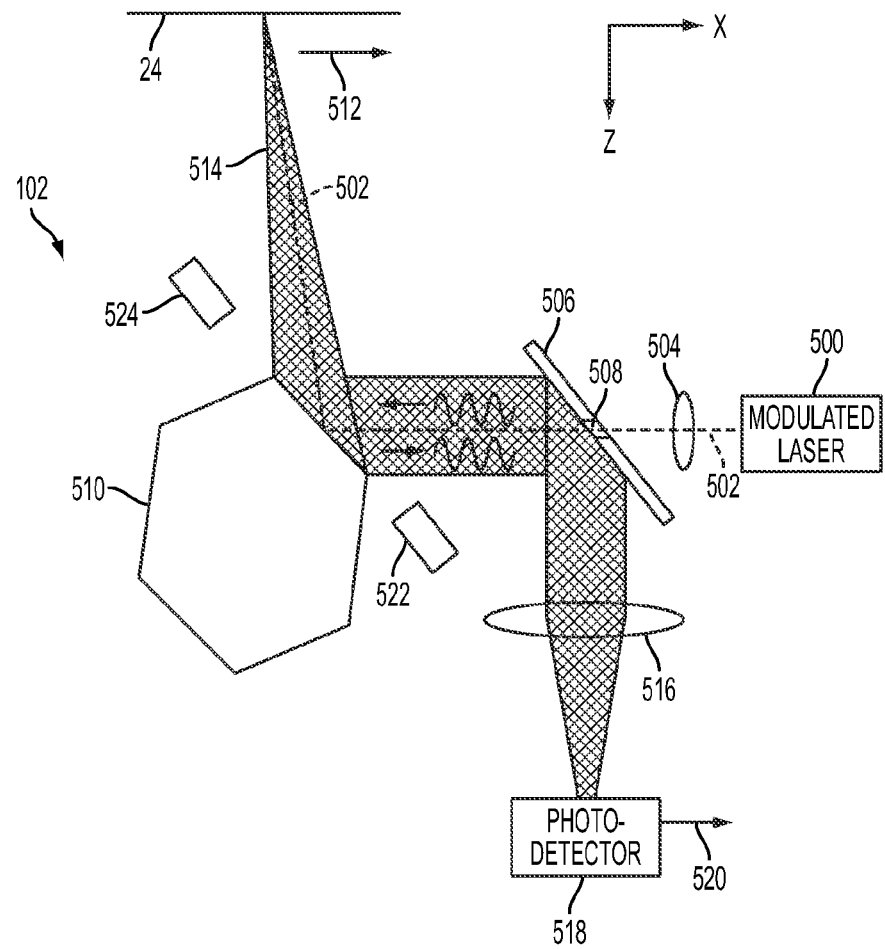
FIG. 18 is a schematic illustration of a scanning system for use in a dimensioner or barcode reader in a system as in FIG. 2.

Referring to FIG. 18, dimensioner 102 comprises a laser scanning device having a mirrored wheel that reflects a laser beam toward the conveyor belt and, as the wheel turns, repeatedly sweeps the beam to form a scan line across the belt transverse to the belt's direction of travel, although not necessarily perpendicular to the travel direction. A scanning system within the dimensioner includes a laser system 500 comprised of a laser diode and a frequency modulation device that produces a laser light output signal 502, modulated to a desired frequency, e.g. 62.5 MHz, which defines the dimensioner's maximum unambiguous range. Laser system 500 outputs light signal 502 to a collimating lens 504, and then to a collecting mirror 506 that defines a hole 508 that allows light signal 502 to pass to the facets of a six-sided, rotating, mirrored wheel 510. A motor (not shown) drives the mirrored wheel so that the wheel moves beam 502 as the beam reflects from the turning wheel's mirrored facets. As the wheel turns, the point on a given facet at which laser beam 502 meets and reflects from the facet moves across the facet surface, sweeping the reflected beam transverse to belt 24, as indicated by arrow 512.

When the beam reaches the end of one facet, the wheel's continued rotation would cause the beam to move over to the next facet, thereby starting the sweep cycle anew. If laser source 500 is maintained constantly activated, the six-sided wheel would sweep the laser beam through a 120 degree angular width scan pattern. However, the scanning system components illustrated in FIG. 18 are disposed within a laser non-transparent housing (not shown), and the laser light exits from the housing through a laser-transparent window (not shown) in the housing between wheel 510 and belt 24 having a dimension in direction 512 that is less than the distance scanned beam 502 sweeps (in direction 512) through a 120 degree arc. In the presently described example, the exit window is disposed in the x-y plane, perpendicular to the z axis indicated in FIG. 18. Thus, even if the laser were to be continuously activated, the scanned beam 502 would only define a scan pattern outside the housing having an angular width defined by the distance between the wheel and the exit window, and the exit window's width in direction 512. In the presently-described embodiment, these dimensions are such that the maximum scan pattern angular width is approximately 73 degrees, although this configuration can vary as desired for a given system.

Light 514, reflected back from belt 24 from incident laser beam 502, reflects in all directions, but only the light that reflects back to wheel 510, and then reflects from a facet to mirror 506, is directed, via a focusing lens 516, to an avalanche photodiode detector 518. Thus, the width of beam 514 as shown in FIG. 18 is a function of the surface area in the x-y plane defined by the wheel facet. It should be noted that while reflected light 514 between belt 24 and wheel 510 sweeps in an arc corresponding to the outgoing beam 502 between the wheel and the belt, reflected light 514 reflects back to the same wheel facet from which beam 502 was directed to the belt, and so the reflected light 514, after being reflected from the wheel facet toward mirror 506, stays in a steady position coaxial with the outgoing beam 502, as indicated in FIG. 18.

Photodetector 518 outputs a signal 520 to the dimensioner's hardware processor (not shown) that corresponds to the amplitude, frequency, and phase of the light signal detected by detector 518. This processor executes programming stored in and retrieved from memory (not shown) or other media in or used with the dimensioner, and in execution of this programming the processor performs the functions of determining dimensions of objects on belt 24 and controlling the operation of laser 500, in response to information provided by reflected laser light collected by detector 518 and by the operation of wheel 510. For instance, laser device 500 is operated in a manner to produce a light beam 502 amplitude-modulated at a constant frequency and phase. If that frequency and phase remain constant, then the difference between that phase and the phase indicated by signal 520 corresponds to the distance traveled by light beam 502 and return light 514 between laser 500 and detector 518, as should be understood in this art. Since the distances between laser 500 and wheel 510, and between wheel 510 and detector 518, remain constant, these constant distances can be backed out of the overall distance indicated by the phase difference in order to determine the distance traveled by light 502 and 514 between wheel 510 and belt 24. Since the "height" of the dimensioner above belt 24 (expressed in the screens discussed below in terms of the distance between the exit window and belt 24, given that the distance between the wheel and the exit window is known) is known, the difference between the dimensioner height and the z-axis component of the distance traveled by light 502 and 514 between the belt and the dimensioner at a given measurement is equal to the height of an object on belt 24 in the z direction. Thus, the dimensioner's actual height above the belt (expressed in terms of the distance between the exit window and the belt, in view of the known distance from the exit window to the wheel) is a calibration parameter that is preferably known to as great a degree of precision as possible or desired.

The z-axis component of the distance between the dimensioner and the object depends on the angle of that distance vector with respect to the z-axis, which in turn is defined by the rotational position of wheel 510 at the time the measurement is made. Accordingly, the wheel mechanism outputs a signal to the dimensioner processor indicating the wheel's angular position. This enables the processor to convert the measured distance data to z-direction height via triangulation. Such calculations should be apparent to those skilled in the art and are therefore not discussed further herein. The wheel's angular position, in combination with the height information, identifies the x axis position of the height data, which the dimensioner determines and stores in the package record.

In a preferred embodiment dimensioner 102 projects the laser scan pattern in the x-z plane, i.e. perpendicular to the belt plane, and transverse to the belt's direction of travel. This means that the scan line, whether on the belt or on an object carried by the belt, is always at the same y-axis position. As described below, the y-direction distance between the photo-eye and the dimensioner (e.g. the point at which the scan line engages the laser scan pattern) is a calibration parameter that the operator provides to the dimensioner processor via a GUI. The dimensioner processor also receives the tachometer count and the photoeye output. When a package passes the photoeye, upstream from the dimensioner, the photoeye outputs this information to the dimensioner processor. Since the dimensioner also receives the tachometer count, the dimensioner processor associates the photoeye event with the tachometer count. When the package reaches the dimensioner's field of view, the dimensioner subtracts the calibration distance (i.e. the y-distance between the photoeye and the dimensioner) from the present tachometer count, and identifies the photoeye package event that corresponds to the package presently at the dimensioner.

The amplitude modulated frequency of the laser light 502 remains reliably consistent during use, but the phase can drift and sometimes experience more sudden changes. Accordingly, dimensioner 102 includes a phase reference 522 disposed at a known position in the dimensioner housing, at the extreme end of the 120 degree sweep created by the six-sided wheel. That is, and again assuming that laser 500 generates a continuous signal throughout the entirety of the 120 degree arc, the beam 502 reflected from the wheel facet sweeps in direction 512 from left to right (in the perspective of the page of FIG. 18), such that the beam strikes phase reference 522 at the end of the 120 degree sweep. Since it is inside the housing, and beyond the edge of the exit window in direction 512, the phase reference is outside the dimensioner's exterior field of view (described above). The phase reference is a reflective surface. Since it is disposed at a known distance from wheel 510, the distance that reflected light 514 travels from phase reference 522 to detector 518 is known, and is fixed. Thus, if light 502 is issued from laser 500 at the intended frequency and phase, the light detected at detector 518 from a reflection from phase reference 522 should exhibit a predetermined phase shift. Accordingly, in one embodiment, at the end of each scan sweep, the dimensioner reflects laser light off of the phase reference, and the processor determines the phase of the signal 520 resulting from this reflection (recall that the dimensioner processor knows the angular orientation of wheel 510 and, therefore, knows when a signal 520 corresponds to a phase reference reflection). If the phase of the phase reference signal is at the expected shift, the light from laser 500 is at its expected configuration, and the dimensioner determines distances (in the manner described above) directly from the phase shifts detected in the reflections received at detector 518 from that part of the same scan that occurred within the dimensioner's external field of view. If, however, the phase shift from the phase reference signal varies from the expected shift, the dimensioner processor calculates the change in phase in the light from laser 500 that would have resulted in the actual phase shift, and uses this originating phase in determining distances from the phase shifts detected in the reflections received at detector 518 from that part of the same scan that occurred within the dimensioner's external field of view.

The procedure described above for accommodating the phase reference data involves significant calculations, and thus in another embodiment, the phase of the phase reference signal may be simply backed out of the phase from the signals from the same scan in the external field of view, to thereby account for phase variations in light 502. Recall that distance along the optical path is determined based on a difference between the detected phase from signal 520 and the intended phase of the AM signal from laser source 500. Suppose there is a shift in the phase of the laser signal from the laser source, and that as a result, an optical path distance that is actually twenty inches appears to be twenty one inches, based on the phase shift of the resulting signal 520. The same one inch difference will appear in the detected distance measurement for the phase reference. Since phase shift corresponds to distance in the optical path, subtraction of the phase shift detected in the phase reference measurement from the phase shift detected at a measurement from the field of view eliminates the effect of the laser output signal's phase drift. Because the optical path in a phase reference measurement is constant and known, the optical path distance for the field of view measurement can be determined based on the resulting differential. The mathematics for such calculations should be understood from the present discussion and are therefore not further discussed herein.

This calculation occurs for each measurement (i.e. at each scan point) taken within the field of view during the dimensioner's normal operation. Thus, for each measurement, the dimensioner processor can determine the optical path distance, e.g. from the dimensioner to the point in the scan at which the beam reflected off the target object. As described above, this distance is part of a vector, the angle of which depends upon the wheel's angular position, which is also known. Therefore, each measurement corresponds to what is, in effect, a location defined in terms of polar coordinates. The dimensioner then converts these coordinates to Cartesian coordinates in which the x axis is perpendicular to the belt's center line and path of travel, the y axis is in the direction of the belt's path of travel, and the z axis is perpendicular to the belt plane, as shown in FIG. 1. The geometry for such a conversion should be apparent to one skilled in the art and is therefore not discussed further herein. Accordingly, each measurement in the field of view results in a set of Cartesian coordinates based on such dimensions, where the measurement data represents height above the belt at a given x location on the belt and at a given y location in the travel of the package. As the dimensioner collects the data over successive scans, the data defines the package's dimensions. This, then, becomes the data associated with a package record, as discussed above.

As described above, in the presently described example, the exit window defines the dimensioner's maximum external field of view. Preferably, however, the exit window is constructed so that this maximum field of view is always wider (in the x direction, transverse to the belt's travel direction) than needed to dimension packages within an expected height, across the width of any belt with which the dimensioner is to be used. That is, assume that the dimensioner is disposed above the belt at a known height, centered in the x direction between the belt edges. Assume also that the maximum expected package height is known, and that a package of this height is on the belt, extending fully across the belt from one to the opposite belt edge. Consider, then, beam 502 in the dimensioner's laser scan sweep, beginning at the counter-clockwise-most point in the maximum field of view, moving clockwise in direction 512, and eventually crossing the first top edge of the package. This point corresponds to a first angular position of wheel 510. Then consider the sweep continuing on in the clockwise direction until the beam reaches the opposite top edge of the package. This point corresponds to a second angular position of wheel 510. The difference between these first and second angular positions is an angle. This angle, in turn, defines the maximum actual field of view within which the scanning system can obtain valid information. Any information outside this field of view cannot be valid information. This angle (optionally including some slight extra angle on each side) defines the "field of view" in the location calculations discussed above and in the calibration procedure discussed below.

In order to determine the field of view, the dimensioner system needs to know the dimensioner's height, the wheel's angular positions when beam 502 crosses the respective left and right belt edges, and the maximum expected box height. The dimensioner height and the wheel's angular positions at the belt edges define a field of view angle under the assumption that no package is on the belt, and the calculations needed to determine this angle should be understood. The maximum box height widens this angle, as should also be understood in view of the present disclosure.

The discussion above presumes, for purposes of explanation, that laser 500 may remain constantly active, and embodiments in which the laser is constantly active are within the scope of the present disclosure. In other embodiments, however, the laser may be selectively activated when needed, but otherwise deactivated, for optimal use of the laser. In the explanation above, the field of use is determined based on detection of the belt edges, in association with respective angular positions of the wheel, and the phase reference's position is known in terms of the wheel's angular position. Accordingly, in one embodiment, the dimensioner processor activates and deactivates repeatedly, in response to the wheel's angular position as detected by the dimensioner processor. In still further embodiments, the dimensioner's operation repeatedly recalibrates the wheel's angular position, thereby accommodating variation and inaccuracies that can occur. For instance, as described above, the last measurement within a scan reflecting from a given facet of wheel 510 is of phase reference 522. When the dimensioner processor activates the laser to take that measurement, the dimensioner processor maintains the laser active only for a time sufficient to allow the turning wheel to traverse beam 502 sufficiently across the phase reference so that the resulting reflected light provides a confidently readable return signal. At this point, the dimensioner processor deactivates the laser. The dimensioner processor may monitor the wheel's angular position or, since the wheel's rotational speed is known, a clock signal, until either the wheel's rotational position or the elapsed time indicates the wheel is in a position at which the following facet will reflect beam 502 to a location within an angular range early in that facet's 120 degree sweep, and more specifically to a location at which the beam will reflect to an initial reflector 524. In this embodiment, reflector 524 is simply a reflective surface of a color substantially brighter than the surrounding interior of the dimensioner housing. Because of the increased brightness, the reflection signal 520 will provide a higher amplitude than if the beam reflects off an interior surface of the dimensioner housing, thus confirming to the dimensioner processor that the beam is in fact engaging sensor 524.

Sensor 524 is at a known, fixed position within the dimensioner housing, and the wheel's angular position needed to reflect beam 502 to the sensor is also known. When the dimensioner processor deactivates the laser following the phase reference signal, and then activates the laser as described above in order to detect sensor 524, and when the return signal is of an amplitude indicating that the laser has in fact detected sensor 524, the dimensioner programmer resets (in terms of software) defines this point in the wheel's rotation to be the zero angle (or a small expected angle through which the wheel is expected to travel from the zero point to the point at which sensor 524 is detected). Given that the positions in the dimensioner housing of sensor 524 and the exit window's leading edge are known, the angular width of the arc traversed by the rotating wheel in sweeping the beam (if the laser were active) from sensor 524 to the exit window's leading edge, or the time needed for the wheel to make that turn, are known and fixed. Thus, monitoring a clock signal or the wheel's angular rotation, the dimensioner processor retains laser 500 in an inactive state until the wheel turns sufficiently far to sweep beam 502 (were the laser active) to the exit window's leading edge or to some point past that edge, as defined by the field of view and the offset angle.

As described above, the field of view is angle through which the scan sweeps that the laser will be activated for taking external measurements, and it is calculated as described above. Also noted above is that a given facet can sweep the laser scan beam through a total arc of 120 degrees. The dimensioner housing, including the exit window, and the laser source, optics and scan wheel are disposed in the housing so that at the center of this 120 degree arc, the outgoing laser beam should be projecting through the center of the exit window. Therefore, by default, the field of view is centered on this 120 degree arc. Suppose, for example, that the field of view is 50 degrees, and there is no angle offset. The field of view would open at 35 degrees and close at 85 degrees, plus or minus the slight offset. In one embodiment, the angle offset always shifts the field of view lower. If there were a 10 degree angle offset, for example, the field of view would extend from 25 degrees to 75 degrees.

To calibrate the angle offset, the dimensioner processor causes the scanning system to execute a scan sufficiently broad that it would necessarily encompass the edges of the exit window. Since the approximate distances of these edges is known, the dimensioner program can locate them and correlate the detected edges with corresponding angular positions of the wheel, and can determine the actual rotational position of the wheel that is half way between these points. If that determined angular position is different than 60 degrees, the difference between the determined angular position and 60 degrees is the angle offset. If the determined angular position is below 60 degrees, the angle offset is positive. If the determined angular position is above 60 degrees, the angle offset is negative.

When the wheel's angular position reaches the opening of the field of view, and in one embodiment a predetermined angular rotation increment (e.g. a quarter degree) before this point, the dimensioner processor activates the laser and maintains the laser in an active state as the wheel sweeps beam 502 through the field of view angle and a similar predetermined angular increment following the field of view. Upon completing this arc, the dimensioner processor deactivates the laser until the wheel reaches the point at which the laser beam reflects from the facet to the phase reference. The dimensioner processor again activates the laser, and the process repeats.

Because the field of view widens beyond the belt edges to accommodate heights of packages that are at the belt edges, it is possible, and in practice common, that scans within the field of view reflect from areas beyond the belt edges. Within the field of view, the dimensioner processor determines package heights (based on phase shift of reflected light) in a manner as described above, in each instance in association with an angular position of wheel 510. Given the radial information, and the wheel's angular position, the dimensioner processor can determine the measurement's x position on the belt, and if a given x position is outside the belt edges, the dimensioner ignores the data. The positions of the belt edges are defined in the operating parameters by the "left ignore" and "right ignore." These numbers can be considered distances in the x direction, from the left and right of the dimensioner's x position, to the belt edges. Calibration of the left and right ignore values is discussed below.

Finally, note also above that height determinations occur as the wheel sweeps beam 502 through the field of view. These determinations occur intermittently, not as a continuous, integrated collection of data. The number of these determinations within a given scan sweep can be set by the operator, as the "scan points" parameter. This is a number by which the dimensioner processor divides the scan sweep (regardless of the angular arc). The higher the number, the more measurements will be made within the scan. This increases accuracy but at the expense of processing speed. Thus, the choice in the selection of the number of scan points is a balance between speed and precision.

Although the scan points parameter can be set manually, it is also a calibrated value, such that the manual entry will override the calibrated value. To calibrate this parameter, the system first determines the field of view and the dimensioner height, as described above. Since measurements are made at uniform increments over the wheel's rotation through the field of view, the distance in the x direction between positions in the belt plane at which measurements occur are widest at the ends of the scan, and given a number of scan points, the distances between measurements at each end of the scan can be determined. In one embodiment, therefore, once the field of view and dimensioner height are determined, the dimensioner program calculates the end inter-measurement distances for a default number of scan points, for example 1000. If the end distance is less than a predetermined threshold, e.g. 0.0125 inches, then the scan points is set to the default value. If the end distance is greater than the threshold, the program calculates the number of scan points that would result in the threshold value and sets the scan points to that value.

To conduct the calibration process, the operator uses a computer that connects via an Ethernet connection directly with the dimensioner, and therefore the dimensioner processor, via a dedicated Ethernet port, or that communicates with the dimensioner and its processor through connection with a network to which the dimensioner is also connected.

A processor on the computer accesses a computer program from a file system or memory on the computer, or other computer-readable media, to facilitate the soft calibration. Any suitable transitory or non-transitory computer readable medium may be utilized. The computer readable medium may be, for example but not limited to, an electronic, magnetic, optical, electromagnetic, infrared, or semiconductor system, apparatus, or device, such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. In the context of this document, a computer readable medium may be any medium that can contain, store, communicate, or transport the program for use by or in connection with the instruction execution system, apparatus, or device. As indicated above, dimensioner 102 also has a processor and memory and may be considered a computer within the present description.

As described below, the dimensioner, via a web server program operated by the dimensioner processor and web browser on the operator's computer, presents to the operator screens of one or more predetermined graphical user interfaces ("GUIs") through which the operator inputs data into the system and directs the computer to perform certain functions as described herein. The screens are the physical instantiations of the GUIs, which can be custom-defined. For example, the operator may attach the computer to the tunnel network and bring up an Internet browser, for example Internet Explorer or other suitable browser, to access the dimensioner processor and a GUI presented by a web server retrieved from memory on the dimensioner and operated by the dimensioner processor.

The operator's computer or computer system may also include a display and a speaker or speaker system. The display may present applications for electronic communications and/or data extraction, uploading, downloading, etc. and may display data as described herein. Any GUI screen discussed herein may be presented on the display. The speaker may present any voice or other auditory signals or information to the operator in addition to or in lieu of presenting such information on the display.

The operator's computer may also include one or more input devices, output devices or combination input and output devices. The I/O devices may include a keyboard, computer pointing device, or similar means to control operation of applications and interaction features. I/O devices may also include disk drives or devices for reading computer media, including computer-readable or computer-operable instructions.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Returning to the dimensioner's calibration process, the distance (in the y direction, i.e. along the belt's path of travel) between the photodetector and the intersection of the dimensioner's laser scan pattern with the belt surface is needed in order to associate the dimensioner's data with a given item on the belt, as described above.

Figure 10:
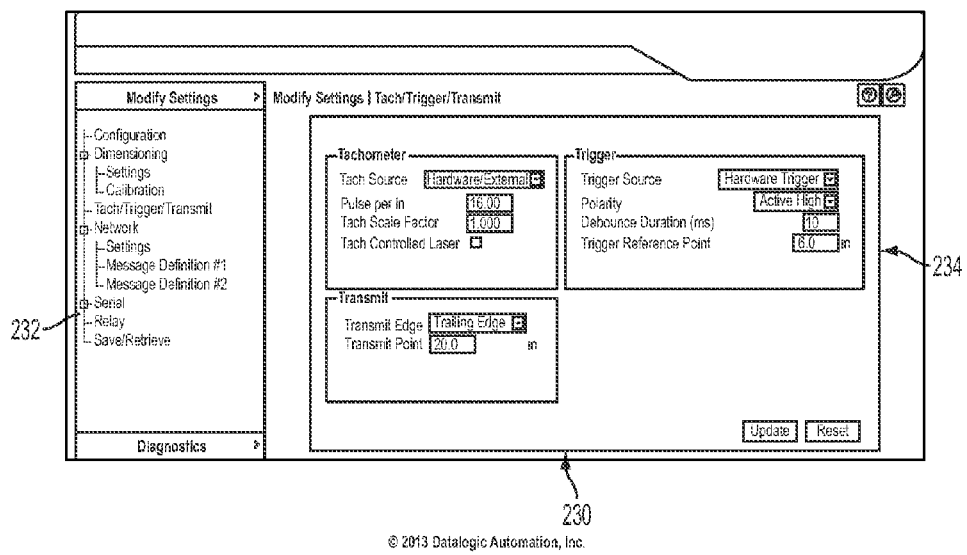
FIG. 10 is an illustration of an interactive graphical user interface page for use in calibration of a dimensioner system as in FIG. 2.

When the operator accesses the calibration program from the dimensioner computer, the program presents a GUI screen 230, as shown in FIG. 10. From a menu 232, the operator selects "Tach/Trigger/Transmit" from a menu hierarchy, causing the program and the GUI screen to present a screen section 234 with various interactive data entry fields into which the operator may input data relating to the tachometer's operation (e.g. the number of tachometer pulses per inch, so that the system processor can correlate between tachometer pulses and distances entered into the system in terms of inches), identifying the transmit point (i.e. the distance, in inches and in the direction of the belt's path of travel, between the photoeye and the transmit point (discussed above)), and the trigger reference point (i.e. the distance, in inches and in the direction of the belt's path of travel, between the photoeye and the intersection between the belt and the dimensioner's laser scan pattern). Upon the operator's activation of an "update" button in the GUI, via a touchscreen on the computer display, mouse click or other I/O device, the computer processor, through execution of the computer program, saves the entered data to the dimensioner computer.

Figure 11:
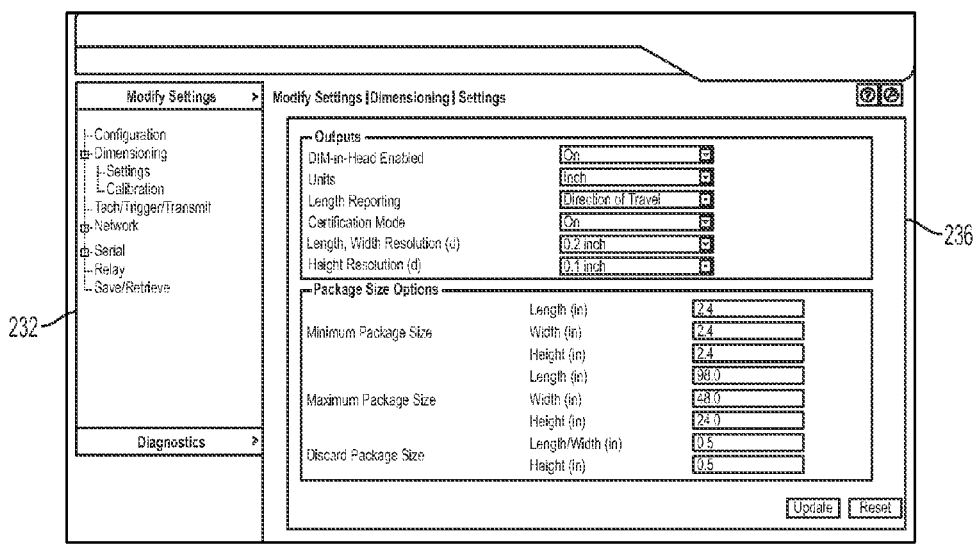
FIG. 11 is an illustration of an interactive graphical user interface page for use in calibration of a dimensioner system as in FIG. 2.

From menu 232, the operator may also select "Dimensioner" and "Settings", thereby causing the program and the GUI screen to present a screen section 236, as shown in FIG. 11, which presents several interactive data entry fields, allowing the operator to enter several parameters regarding the dimensioner's operation, including the minimum and maximum sizes of packages expected on the belt. The operator's activation of an "Update" button causes the computer program on the dimensioner processor to save the entered parameters to the dimensioner memory.

Figure 12:
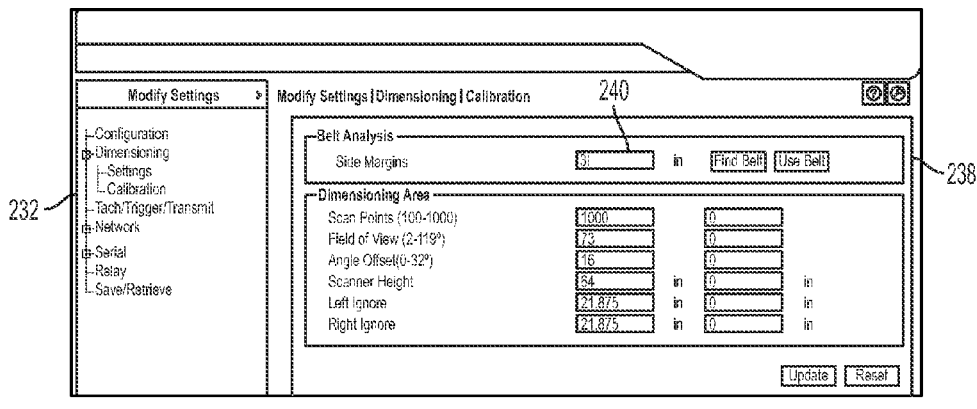
FIG. 12 is an illustration of an interactive graphical user interface page for use in calibration of a dimensioner system as in FIG. 2.

Referring to FIG. 12, the operator selects from menu 232 "Dimensioner" and "Calibration" to cause the program and the dimensioner GUI screen to present a screen section 238. The main portion of screen section 238 lists the present values for several operating parameters stored in the dimensioner memory. If this is the dimensioner's initial use, these values will be factory default values. "Scanner height" refers to the dimensioner's height above the belt. As discussed above, the operative distance is the distance between the wheel and the belt surface, but because the distance between the wheel and the exit window is known and fixed, in this embodiment the height value represented in the field shown in FIG. 12 is provided in terms of distance from the exit window to the belt surface. This initially assumed value is the basis for making the mark on vertical member 178 (FIG. 6A), intended to guide the mounting of dimensioner 102, to thereby preliminarily locate the dimensioner near the desired height, but the operator can mount the device at a different height, and the calibration step discussed below will change the value to the actual height. As noted above, the left and right ignores are the respective distances from the dimensioner's x position on the belt to the belt edges, and so the default belt width is 43.75 inches. From the dimensioner's height, and assuming the highest box height at each of the lateral edges of belt 24, the dimensioner processor may determine field of view angle, as discussed above. For the default value, however, the field of view may be based on the exit window width, i.e. the maximum possible field of view, since the calibration will determine an actual field of view.

As noted above, "scan points" refers to the number of height measurements that will be made within a scan over the field of view.

Figure 13:
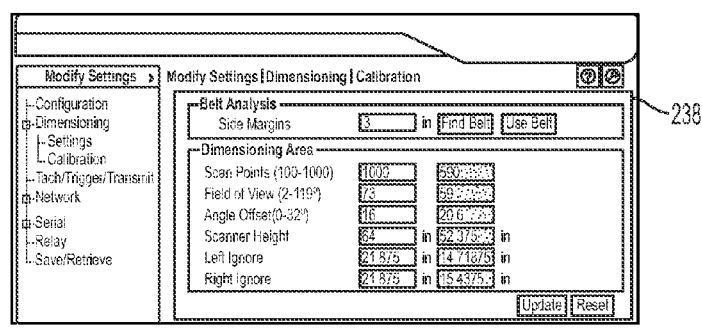
FIG. 13 is an illustration of an interactive graphical user interface page for use in calibration of a dimensioner system as in FIG. 2.
Figure 14:
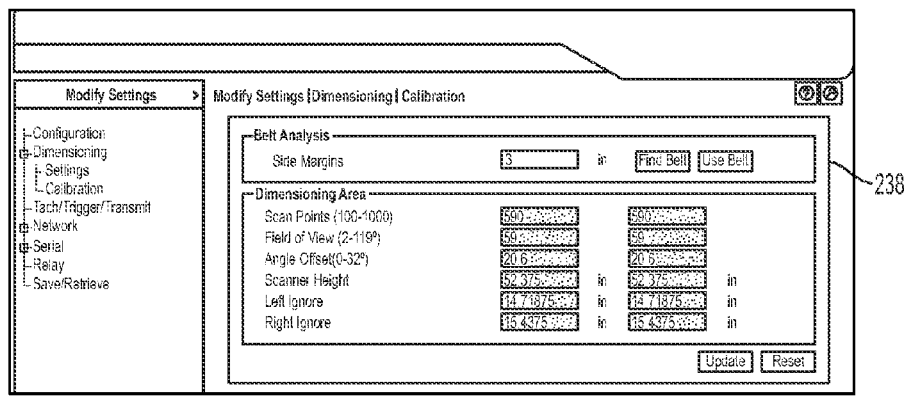
FIG. 14 is an illustration of an interactive graphical user interface page for use in calibration of a dimensioner system as in FIG. 2.
Figure 15:
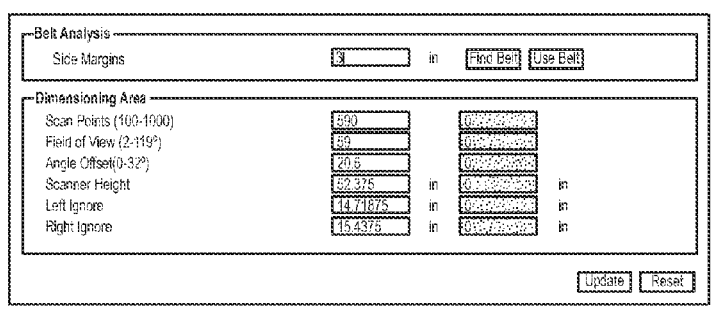
FIG. 15 is an illustration of an interactive graphical user interface page for use in calibration of a dimensioner system as in FIG. 2.

The operator's activation, via the GUI presented on the operator's computer screen, of a "Find Belt" button in the upper part of screen 238 causes the dimensioner computer program and processor to execute a scan downward to the belt (there should be no boxes on the belt at this time) over the factory-set field of view (for this reason, use of the maximum possible field of view as the factory-installed field of view is preferred in one embodiment). From the return data (signals 520, FIG. 18), the dimensioner processor determines the actual distance from the dimensioner to the belt surface, as described above with respect to FIG. 18, and populates a field in the right hand column of the main section of screen section 238 with this number, as shown in FIG. 13. The dimensioner processor also identifies the belt edges from the scan data (as described below). From this information, along with the detected actual dimensioner height and the maximum box height entered by the operator (FIG. 11), the computer program executed by the dimensioner processor determines actual field of view, angle offset, scan points, and left and right ignore, as described above with respect to FIG. 18 and, with respect to the left and right ignores, below with respect to FIG. 16. The operator may, via the GUI and using the I/O features of the operator's computer, manually enter any of the values, overriding the calibrated values. These new calibrated values are shown in FIG. 13, populated in the right (shaded) column in the main section of screen section 238. Activation of a "Use Belt" button causes the dimensioner program to move the calculated data over to the left column, as shown in FIG. 14. The left column, shaded to indicate that the data has not yet been uploaded to the dimensioner, gives the operator an opportunity to manually change any values, if desired. Activation of an "Update" button causes the operator computer's program to save these parameters in dimensioner memory, from which they are thereafter used in the dimensioner's operation by the dimensioner processor, as discussed above with request to FIG. 18. At this point, the highlighting is removed from the left column, and the right column is cleared, as shown in FIG. 15.

Figures 16, 17:
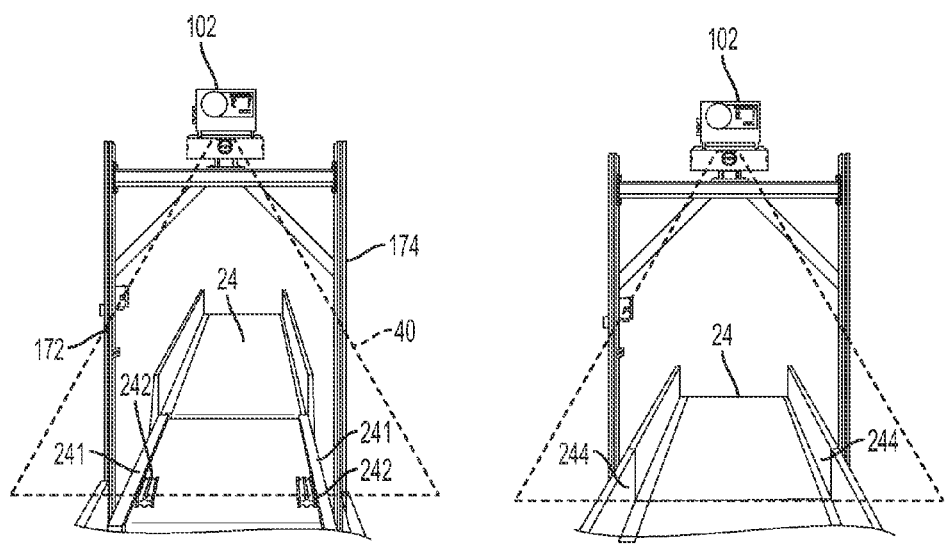
FIG. 16 is a partial schematic illustration of a dimensioner system as in FIG. 2.
FIG. 17 is a partial schematic illustration of a dimensioner system as in FIG. 2.

The discussion above assumes that the belt edges are detectable from the returned scan data. However, unless there is an edge of the frame rail immediately adjacent the belt edges that produces a detectable height, or a gap between the belt edges and the frame adjacent the belt of a sufficient distance, the belt edges may not be reliably detectable from the scan data. Referring to FIG. 16, for example, while high side rails may be commonly used along most of the length of the conveyor belt system, these may be removed to allow placement of the vertical members 172 and 174 of the scanning tunnel, or for other purposes. Where the rails 241 immediately adjacent belt 24 have a top surface approximately coplanar with the belt and close to the belt edges, the belt edges may not be detectable.

Accordingly, the operator may place structures of a height sufficient to be detectable in the scan data a known distance (measured transverse to the belt's travel direction, i.e. in the x direction) from the belt edge. In one embodiment, the respective structures are placed at the same distance, and in the same orientation (i.e. both outward or both inward, in the x direction and with respect to the belt center line) with respect to the edges. Referring to FIG. 12, the operator enters this offset distance into an interactive data window 240 of screen section 238. In this example, the operator has placed structures of a detectable height three inches inside both belt edges (i.e. on the same side of the belt edges from the belt center line). In this embodiment, the program allows only a positive number, such that the offset is always placed inward of the belt edges, but in another embodiment, offset structures may be placed on the outside of the belt edges, with the entered value being negative. When the dimensioner's computer receives the scan data from signals 520 (FIG. 18) resulting from the scan triggered by the "Find Belt" function, the data will reflect detection of the belt edges from the operator-added structures, rather than the belt edges. Accordingly, the dimensioner's computer program adds the offset number entered at window 240 to each reported belt edge position (outwardly away from the belt center, in the x direction) to determine the actual belt edge positions. Based on this information, the parameters are calculated as discussed above.

Returning to FIG. 16, the operator has placed two pieces of tunnel frame rails 242 on the belt so that the outside edge of each rail is aligned with a respective belt edge. The rails are of identical construction, and so their widths inward from the belt edges, toward the belt center in the x direction, are the same. The operator enters this width into field 240, shown in FIG. 12, as a positive number because the width extends inward from the belt edges. In analyzing the scan data, the dimensioner program finds the detected height data corresponding to a predetermined area that is expected to be on the belt, for example the height data associated with the twenty center measurements within the field of view executed in the calibration scan, and averages the height data for these points. The x positions corresponding to these points should be at or close to the belt center, and are therefore very likely to be on the belt surface. Moving to the left and right of the detected center point, the program sequentially examines the height data associated with each next measurement point (i.e. the next measurement point taken as a result of the "scan points" number), and compares that number to the previous height point. If the next and previous height points differ less than one inch, or alternatively if the next point is less than one inch different from the calculated average of the starting twenty points, the program assumes the scan remains on the belt surface, and moves to the next point. This process repeats in both directions, until, in each direction, the program detects a height change (positive or negative) of one inch or more. At that point (in the x direction), plus the offset entered by the operator, the belt edge is deemed to have occurred. Because the dimensioner height is known, and the wheel's angular position is known at the point at which the belt edges occur, the dimensioner program can and does calculate the distance (in inches) in the x direction from the detected belt center to each of the left and right belt edges. These two numbers are, respectively, the left and right ignore numbers, and the program enters these numbers in the calibration fields, as discussed above with respect to FIGS. 13-15.

Referring now to FIG. 17, the belt frame includes rails 244 that extend through the tunnel, so that without offsets as described above, the system would detect the belt edges as occurring at the frame sides. In some instances, this may be acceptable, as packages carried by the belt may extend laterally beyond the belt edges to a slight degree but still be bounded by the side rails. In such a system, it may be desirable to allow the system to consider the belt as extending laterally out to the rails and dimension packages out to that extent. Alternatively, the operator may measure the distance from each rail to the belt edge in the x direction, and assuming these are, or are close to, the same number, enter this distance as a negative number in the side margins field. To reach the same result, the operator may place inwardly-extending offset structures on the belt and enter the size margin values as a positive number equal to the structure's width, as described above with respect to FIG. 16. By either approach, the calibration detects the actual belt edges instead of the side rails.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A method of calibrating a dimensioning system, comprising the steps of:
providing a scanning tunnel having
a frame,
a conveyor structure having a generally planar surface and being moveable with respect to the frame in a direction of travel, and
a scanning system in a position with respect to the frame that is fixed during movement of the conveyor structure in the direction of travel, wherein the scanning system comprises
a light source,
an optics system that
directs light from the source toward the conveyor structure so that the light extends across the conveyor structure transverse to the direction of travel and reflects from positions on the conveyor structure and positions on objects carried by the conveyor structure and
receives light reflected from the positions,
a detector that receives the reflected light from the optics system and that outputs a signal corresponding to at least one characteristic of the reflected light, and
a processor that receives the signal output by the detector and determines a distance between the generally planar surface and the positions from which the light is reflected based on a characteristic of the signal,
wherein, in a calibration mode, the processor
determines distances corresponding to positions extending across a central portion of the conveyor structure,
identifies a first location proximate the central portion, in a direction transverse to the direction of travel, at which the distance is greater than the distances determined at positions in the central portion according to a predetermined criteria, and
identifies a location that is offset, in a direction transverse to the direction of travel, by a predetermined offset distance;
providing a reference structure with an edge surface having a height sufficient to meet the predetermined criteria;
disposing the reference structure on the conveyor structure so that the edge surface faces a central portion of the conveyor structure;
communicating to the processor an actual distance between the edge surface of the reference structure and an edge of the conveyor structure so that the processor applies the actual distance as the offset distance in the calibration mode; and
activating the scanning system in the calibration mode so that the light directed from the source extends across the edge surface of the reference structure.

2. The method as in claim 1, wherein the light source is a laser light source.

3. A scanning tunnel comprising:
a frame;
a conveyor structure having a generally planar surface and being moveable with respect to the frame in a direction of travel; and
a scanning system in a position with respect to the frame that is fixed during movement of the conveyor structure in the direction of travel, wherein the scanning system comprises
a laser light source,
an optics system that
directs light from the source toward the conveyor structure so that the light extends across the conveyor structure transverse to the direction of travel and reflects from positions on the conveyor structure and positions on objects carried by the conveyor structure and
receives light reflected from the positions,
a detector that receives the reflected light from the optics system and that outputs a signal corresponding to at least one characteristic of the reflected light, and
a processor that receives the signal output by the detector and determines a distance between the generally planar surface and the positions from which the light is reflected based on a characteristic of the signal,
wherein, in a calibration mode, the processor
determines distances corresponding to positions extending across a central portion of the conveyor structure,
identifies a first location proximate the central portion, in a direction transverse to the direction of travel, at which the distance is greater than the distances determined at positions in the central portion according to a predetermined criteria, and
identifies a location that is offset, in a direction transverse to the direction of travel, by a predetermined offset distance.

4. The method as in claim 1, wherein the first providing step comprises providing a said scanning tunnel having at least one barcode reader that is separate from the scanning system.

5. The method as in claim 1, wherein the first providing step comprises providing a said scanning tunnel having at least one barcode reader with a light source and optics system separate from the light source and optics system of the scanning system.

6. A scanning tunnel comprising:
a frame;
a conveyor structure having a generally planar surface and being moveable with respect to the frame in a direction of travel; and
a scanning system in a position with respect to the frame that is fixed during movement of the conveyor structure in the direction of travel, wherein the scanning system comprises
a light source,
an optics system that
receives light from the light source and directs a beam of the received light toward the conveyor structure so that the beam repeatedly sweeps through a first angular width across the conveyor structure in a direction transverse to the direction of travel and reflects from reflection positions on the conveyor structure and objects carried by the conveyor structure, and
receives light reflected from the reflection positions,
a detector that receives the reflected light from the optics system and that outputs a signal corresponding to at least one characteristic of the reflected light, and
a processor that receives the signal output by the detector and determines respective positions of the reflection positions relative to the generally planar surface, based on a characteristic of the signal and based upon respective angular positions of the beam at the reflection positions, wherein, in a calibration mode, the processor determines a second angular width between opposing edges of the conveyor structure within sweep of the beam, based upon application of a predetermined criteria to a characteristic of the signal, determines a position of the conveyor structure relative to the scanning system based upon a characteristic of the signal and based upon a known said angular position, and based upon the second angular width, the position of the conveyor structure relative to the scanning system, and predetermined maximum heights of said objects relative to the opposing edges, determines the first angular width.

7. The tunnel as in claim 6, wherein the light source outputs collimated light.

8. The tunnel as in claim 6, wherein the processor determines a said respective position based on a distance traveled by the light in the beam between the optics system and the reflection position corresponding to the respective position and upon angular position of the beam.

9. The tunnel as in claim 6, wherein the processor converts a description of the respective positions from distance and angular position to Cartesian coordinates.

10. The tunnel as in claim 6, wherein the processor determines respective locations, in a direction transverse to the direction of travel, of each of the opposing edges.

11. The tunnel as in claim 10, wherein the processor stores data corresponding to a said respective position if a location of said respective position in the transverse direction is between the locations of the opposing edges.

12. The tunnel as in claim 10, wherein the processor determines each said respective location based on a distance traveled by the light in the beam between the optics system and the reflection position corresponding to the respective location and upon angular position of the beam.

13. The tunnel as in claim 6, wherein the predetermined criteria corresponds to height of said reflection position above the conveyor structure.

14. The tunnel as in claim 6, wherein, in the calibration mode, the processor assumes an initial number of angular positions, for a distance extending across the first angular width in a direction transverse to the direction of travel, assumes a number of reflection positions along the distance corresponding to the initial number of angular positions, determines a distance between adjacent reflection positions, if the distance between the adjacent reflection positions is below a predetermined threshold, sets a number of angular positions at which the processor will determine the respective positions within a sweep through the first angular width to a number corresponding to the initial number, and if the distance between the adjacent reflection positions is above the predetermined threshold, sets a number of angular positions at which the processor will determine the respective positions within a sweep through the first angular width to a number above the initial number.

15. The tunnel as in claim 6, wherein the light source is laser.

16. The tunnel as in claim 6, wherein the optics system includes a rotatable mirrored wheel that receives the light from the light source and reflects the beam of the received light toward the conveyor structure.

17. The tunnel as in claim 6, wherein the relative position is distance between the reflection position and the conveyor structure.

18. The tunnel as in claim 6, wherein the characteristic of the signal upon which the processor determines the respective positions is phase of the signal.

19. The tunnel as in claim 6, wherein the processor is configured to accept a selection from an operator of a number of angular positions at which the processor will determine the respective positions, and to accept the selection if a distance between adjacent respective positions is within a predetermined range.

20. The tunnel as in claim 6, comprising a housing that encloses the light source, the optics system, and the detector and that defines a window between the optics system and the conveyor structure, the window having a width in the direction transverse to the direction of travel, and being disposed at a distance from a position in the optics system at which the light is received from the light source and directed toward the conveyor structure, so that a third angular width from the light receiving and directing position, between opposing edges of the window in the direction transverse to the direction of travel, is greater than the first angular width.

21. A conveyor system, comprising:

a frame;

a conveyor structure having a generally planar surface and being moveable with respect to the frame in a direction of travel, wherein the frame has a member with a length in a direction transverse to a plane of the generally planar surface;

a bracket secured onto the member so that the bracket's position on the member along the length is adjustable, wherein the bracket defines a transparent portion through which a surface of the member is visible;

a light system secured on the bracket, wherein the light system comprises a light source, an optics system that directs light from the source toward the conveyor structure so that the light extends across the conveyor structure transverse to the direction of travel and reflects from positions on the conveyor structure and positions on objects carried by the conveyor structure and receives light reflected from the positions on e conveyor structure and the objects, and a detector that receives the reflected light from the optics system and that outputs a signal corresponding to at least one characteristic of the reflected light, wherein the light system is secured on the bracket so that the surface of the member is visible through the transparent portion from a side of the bracket opposite the member.

22. A method of installing a light system in a conveyor system having a frame and a conveyor structure having a generally planar surface and being movable with respect to the frame in a direction of travel, comprising the steps of:

providing a member attached to the frame, wherein the member has a length in a direction transverse to a plane of the generally planar surface;

providing a bracket secured onto the member so that the bracket's position on the member along the length is adjustable, wherein the bracket defines a transparent portion through which a surface of the member is visible;

securing a light system on the bracket so that the surface of the member is visible through the transparent portion from a side of the bracket opposite the member, wherein the light system comprises
- a light source,
- an optics system that
  - directs light from the source toward the conveyor structure so that the light extends across the conveyor structure transverse to the direction of travel and reflects from positions on the conveyor structure and positions on objects carried by the conveyor structure and
  - receives light reflected from the positions on e conveyor structure and the objects, and
- a detector that receives the reflected light from the optics system and that outputs a signal corresponding to at least one characteristic of the reflected light;

placing a mark at a position on the member so that the mark is visible through the transparent portion when the bracket is at a position on the member that places the light system at a predetermined distance from the conveyor structure.

23. A conveyor system, comprising:
a frame;
a conveyor structure having a generally planar surface and being moveable with respect to the frame in a direction of travel;
a bracket secured onto the frame and having a first portion and a second portion, the first portion being disposed in a fixed position with respect to the frame in a plane parallel to a plane of the generally planar surface, and the second portion being disposed pivotally with respect to the first portion within a plane parallel to the plane of the generally planar surface, wherein one of the first portion and the second portion defines a plurality of sequentially aligned first notches, and wherein the other of the first portion and the second portion defines at least one second notch adjacent to the plurality of first notches in a direction parallel to the plane of the generally planar surface, and wherein the first portion and the second portion are movable with respect to each other between the first notches and the at least one second notch;
a light system secured on the bracket, wherein the light system comprises
- a light source,
- an optics system that
  - directs light from the source toward the conveyor structure so that the light extends across the conveyor structure transverse to the direction of travel and reflects from positions on the conveyor structure and positions on objects carried by the conveyor structure and
  - receives light reflected from the positions on the conveyor structure and the objects, and
- a detector that receives the reflected light from the optics system.

24. A method of installing a light system in a conveyor system having a frame and a conveyor structure having a generally planar surface and being movable with respect to the frame in a direction of travel, comprising the steps of:
providing a bracket secured onto the frame, wherein the bracket has a first portion and a second portion, the first portion being disposed in a fixed position with respect to the frame in a plane parallel to a plane of the generally planar surface, and the second portion being disposed pivotally with respect to the first portion within a plane parallel to the plane of the generally planar surface, wherein one of the first portion and the second portion defines a plurality of sequentially aligned first notches, and wherein the other of the first portion and the second portion defines at least one second notch adjacent to the plurality of first notches in a direction parallel to the plane of the generally planar surface, and wherein the first portion and the second portion are movable with respect to each other between the first notches and the at least one second notch;
providing a light system secured on the bracket and comprising
- a light source,
- an optics system that
  - directs light from the source toward the conveyor structure so that the light extends across the conveyor structure transverse to the direction of travel and reflects from positions on the conveyor structure and positions on objects carried by the conveyor structure and
  - receives light reflected from the positions on the conveyor structure and the objects, and
- a detector that receives the reflected light from the optics system; and inserting a member simultaneously into a said at least one second notch and a said first notch, and applying a force through the member in a direction parallel to the plane of the generally planar surface about one of the said at least one second notch and said first notch, thereby applying force to the other of said at least one second notch and said first notch and pivoting the second portion with respect to the first portion.

25. A conveyor system, comprising:
a frame;
a conveyor structure having a generally planar surface and being moveable with respect to the frame in a direction of travel;
a bracket secured onto the frame and having a first portion and a second portion, the first portion being disposed in a fixed position with respect to the frame in a first plane transverse to a plane of the generally planar surface, and the second portion being disposed in a second plane transverse to the first plane and pivotally with respect to the first portion about an axis parallel to a plane of the generally planar surface, wherein one of the first portion and the second portion defines a plurality of sequentially aligned first notches, and wherein the other of the first portion and the second portion defines at least one second notch adjacent to the plurality of first notches, and wherein the first portion and the second portion are movable with respect to each other between the first notches and the at least one second notch;
a light system secured on the bracket, wherein the light system comprises
- a light source,
- an optics system that
  - directs light from the source toward the conveyor structure so that the light extends across the conveyor structure transverse to the direction of travel and reflects from positions on the conveyor structure and positions on objects carried by the conveyor structure and
  - receives light reflected from the positions on the conveyor structure and the objects, and
- a detector that receives the reflected light from the optics system.

26. A method of installing a light system in a conveyor system having a frame and a conveyor structure having a generally planar surface and being movable with respect to the frame in a direction of travel, comprising the steps of:

providing a bracket secured onto the frame, wherein the bracket has a first portion and a second portion, the first portion being disposed in a fixed position with respect to the frame in a first plane transverse to a plane of the generally planar surface, and the second portion being disposed within a second plane transverse to the first plane and pivotally with respect to the first portion about an axis parallel to a plane of the generally planar surface, wherein one of the first portion and the second portion defines a plurality of sequentially aligned first notches, and wherein the other of the first portion and the second portion defines at least one second notch adjacent to the plurality of first notches, and wherein the first portion and the second portion are movable with respect to each other between the first notches and the at least one second notch;

providing a light system secured on the bracket and comprising
- a light source,
- an optics system that
  - directs light from the source toward the conveyor structure so that the light extends across the conveyor structure transverse to the direction of travel and reflects from positions on the conveyor structure and positions on objects carried by the conveyor structure and
  - receives light reflected from the positions on the conveyor structure and the objects, and
- a detector that receives the reflected light from the optics system; and inserting a member simultaneously into a said at least one second notch and a said first notch, and applying a force through the member about one of the said at least one second notch and said first notch, thereby applying force to the other of said at least one second notch and said first notch and pivoting the second portion with respect to the first portion.

27. A scanning tunnel comprising:
a frame;
a conveyor structure having a generally planar surface and being moveable with respect to the frame in a direction of travel; and a scanning system in a position with respect to the frame that is fixed during movement of the conveyor structure in the direction of travel, wherein the scanning system comprises
- a light source,
- an optics system that
  - receives light from the light source and directs a beam of the received light toward the conveyor structure so that the beam repeatedly sweeps through an angular width across the conveyor structure in a direction transverse to the direction of travel and reflects from reflection positions on the conveyor structure and objects carried by the conveyor structure, and
  - receives light reflected from the reflection positions,
- a detector that receives the reflected light from the optics system and that outputs a signal corresponding to at least one characteristic of the reflected light, and
- a processor that receives the signal output by the detector and determines respective positions of the reflection positions relative to the generally planar surface, based on a characteristic of the signal and based upon respective predetermined angular positions of the beam at the reflection positions,
- wherein, in a calibration mode, the processor presents an interactive user interface through which an operator may select the predetermined angular positions.

28. The tunnel as in claim 27, wherein the user interface receives a selection by the operator of a number of angular positions at which the processor will determine the respective positions within a sweep through the angular width.

29. The tunnel as in claim 28, wherein the processor accepts the selection, and thereby accepts a selection of the predetermined angular positions, if a distance between adjacent respective positions is within a predetermined range.

30. The tunnel as in claim 27, wherein the processor executes a web server program so that the processor presents the user interface to the operator through the web server program and a browser program on a computer remote from the optics system.

* * * * *